United States Patent
Buer

(10) Patent No.: US 8,010,055 B2
(45) Date of Patent: Aug. 30, 2011

(54) METHOD AND APPARATUS FOR RF COMMUNICATION SYSTEM SIGNAL TO NOISE RATIO IMPROVEMENT

(75) Inventor: Kenneth V. Buer, Gilbert, AZ (US)

(73) Assignee: ViaSat, Inc., Carlsbad, CA (US)

( * ) Notice: Subject to any disclaimer, the term of this patent is extended or adjusted under 35 U.S.C. 154(b) by 723 days.

(21) Appl. No.: 12/030,300

(22) Filed: Feb. 13, 2008

(65) Prior Publication Data
US 2009/0203328 A1 Aug. 13, 2009

(51) Int. Cl.
*H04B 1/44* (2006.01)

(52) U.S. Cl. ......... 455/78; 455/82; 455/114.2; 455/118; 455/63.1; 455/207; 455/314; 375/150; 375/152; 375/143; 330/133; 333/207

(58) Field of Classification Search ............ 455/78, 455/82, 114.2, 118, 63.1, 207, 314; 375/150, 375/152, 143; 330/133; 333/207
See application file for complete search history.

(56) References Cited

U.S. PATENT DOCUMENTS

| | | | | |
|---|---|---|---|---|
| 5,930,686 | A * | 7/1999 | Devlin et al. ............... | 455/84 |
| 6,115,363 | A * | 9/2000 | Oberhammer et al. ....... | 370/277 |
| 6,704,349 | B1 * | 3/2004 | Masenten ................. | 375/219 |
| 6,795,690 | B2 * | 9/2004 | Weissman et al. .......... | 455/78 |
| 7,408,898 | B1 * | 8/2008 | Brown ..................... | 370/328 |
| 7,415,066 | B2 * | 8/2008 | Feher ...................... | 375/232 |
| 7,633,435 | B2 * | 12/2009 | Meharry et al. ............ | 342/198 |
| 7,697,462 | B1 * | 4/2010 | Dunn et al. ................ | 370/278 |
| 2003/0050018 | A1 | 3/2003 | Weissman et al. | |
| 2005/0255812 | A1 * | 11/2005 | Na et al. .................. | 455/78 |

FOREIGN PATENT DOCUMENTS

| | | |
|---|---|---|
| KR | 10-2001-0028923 | 4/2001 |
| KR | 10-2006-0009767 | 2/2006 |
| WO | WO 99/060717 | 11/1999 |

OTHER PUBLICATIONS

International Search Report and Written Opinion issued in corresponding Int'l Application No. PCT/US09/033683 on Aug. 7, 2009.
International Preliminary Report on Patentability for Application No. PCT/US09/033683 dated Aug. 17, 2010, 2 pages.

* cited by examiner

*Primary Examiner* — Marceau Milord
(74) *Attorney, Agent, or Firm* — Snell & Wilmer LLP

(57) ABSTRACT

The signal to noise ratio performance of a RF communication system can be improved by providing resistance to transmitter self-jamming and eliminating or reducing the need for a transmit rejection filter or other measures such as limiters or blanking switches. An anti-jam low noise amplifier provides enough rejection and jamming immunity to reduce or eliminate the need for the transmit reject filter. Thus, the system noise performance is improved by eliminating the filter and the associated losses which cause signal to noise ratio performance degradation.

16 Claims, 3 Drawing Sheets

FIG. 1: Prior Art

METHOD AND APPARATUS FOR RF COMMUNICATION SYSTEM SIGNAL TO NOISE RATIO IMPROVEMENT

FIELD OF INVENTION

The present invention relates to radio frequency communication systems. More particularly, the invention relates to a radio frequency communication system having improved system signal to noise ratio performance by, for example, providing resistance to transmitter self-jamming and reducing or eliminating the need for a transmit rejection filter.

BACKGROUND OF THE INVENTION

Radio frequency (RF) communication systems that transmit and receive RF signals must account for self interference leakage of a transmit signal into the receive channel. In general, RF communication systems provide adequate isolation to reject or limit self interference at the receiver by implementing blanking switches, limiters, filters, or a combination thereof.

The addition of such limiters, blanking switches or filters to the RF communication system causes a loss of signal power in the system through the attenuation of a portion of the receive signal. This attenuation of the signal power causes a reduction in the signal to noise ratio at the receiver input. Therefore, there is a need for a system that has improved signal to noise ratio performance.

SUMMARY OF THE INVENTION

The signal to noise ratio performance of a RF communication system can be improved by providing resistance to transmitter self-jamming and eliminating or reducing the need for a transmit rejection filter or other measures such as limiters or blanking switches. An anti-jam low noise amplifier provides enough rejection and jamming immunity to reduce or eliminate the need for the transmit reject filter. Thus, the system noise performance is improved by eliminating the filter and the associated losses which cause signal to noise ratio performance degradation.

BRIEF DESCRIPTION OF THE DRAWING FIGURES

A more complete understanding of the present invention may be derived by referring to the detailed description and claims when considered in connection with the drawing figures, wherein like reference numbers refer to similar elements throughout the drawing figures, and:

DETAILED DESCRIPTION

While exemplary embodiments are described herein in sufficient detail to enable those skilled in the art to practice the invention, it should be understood that other embodiments may be realized and that logical electrical and mechanical changes may be made without departing from the spirit and scope of the invention. Thus, the following detailed description is presented for purposes of illustration only.

Figure 1:
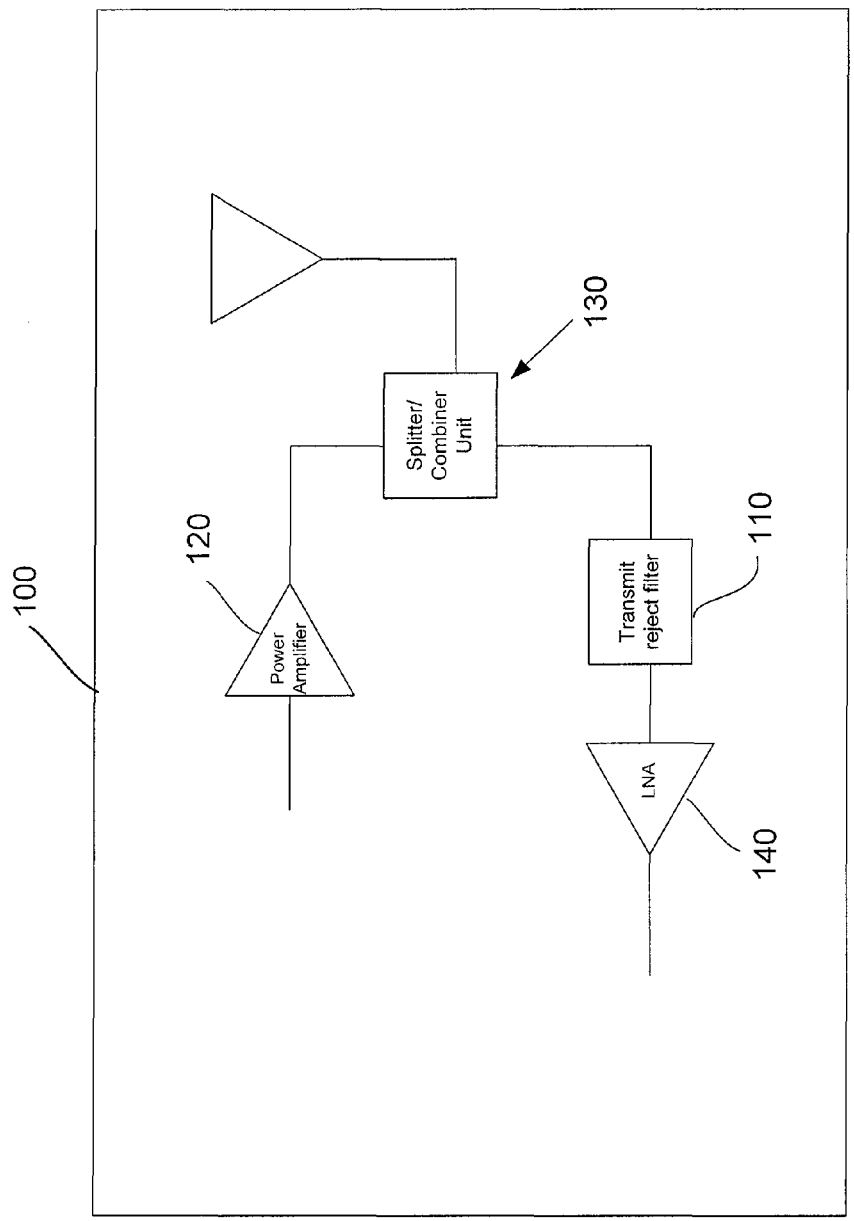
FIG. 1 shows a schematic diagram of an example of a prior art RF communication system.

With reference to FIG. 1, a prior art RF communication system 100 includes a transmit reject filter 110, a power amplifier 120, a splitter/combiner unit 130, and a low noise amplifier (LNA) 140. An example of a common transmit reject filter 110 used in prior art systems is a waveguide cavity filter. Additionally, a typical loss of power associated with the use of transmit reject filter 110 is 0.5 to 1.0 dB.

Figure 2:
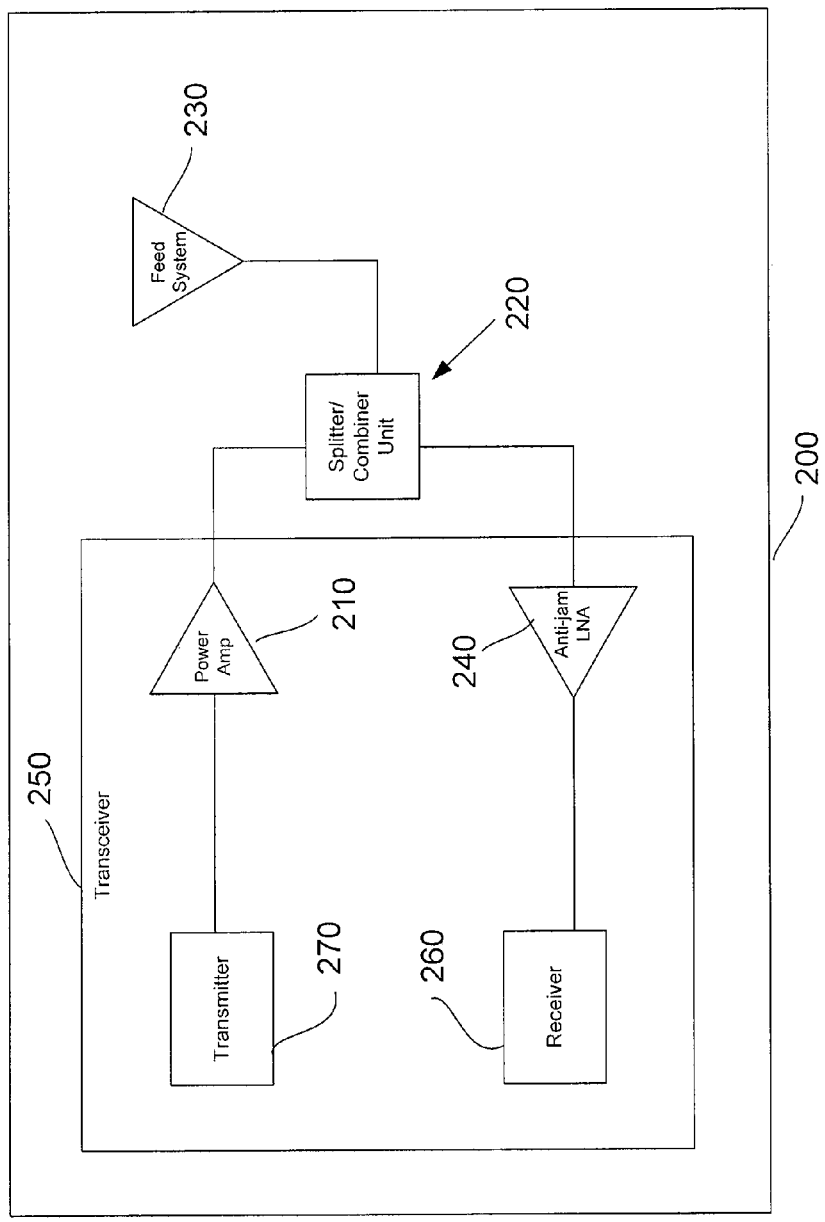
FIG. 2 shows a schematic diagram of an example of a RF communication system without a transmit reject filter.

In accordance with an exemplary embodiment of the present invention, and with reference to FIG. 2, a RF communication system 200 with improved noise performance includes a splitter/combiner unit 220, an anti-jam low noise amplifier (anti-jam LNA) 240, a receiver 260, and a transmitter 270. RF communication system 200 may further comprise a power amplifier 210 and/or a feed system 230. RF communication system 200 further comprises a transmit channel, a receive channel, and a common channel. All three channels connect through splitter/combiner unit 220. Power amplifier 210 is in communication with the transmit channel of RF communication system 200. In addition, anti-jam LNA 240 is in communication with the receive channel of RF communication system 200. Furthermore, antenna feed 230 is in communication with the common channel of RF communication system 200.

In one exemplary embodiment, receiver 260 and transmitter 270 are a part of a transceiver 250. In another exemplary embodiment, transceiver 250 may further comprise power amplifier 210, splitter/combiner unit 220, LNA 240, or any combination thereof. In accordance with an exemplary embodiment, transceiver 250 houses both a receiver and a transmitter, with common circuitry utilized in receive and transmit functions. In accordance with an exemplary embodiment of the invention, transceiver 250 is US Monolithics model number USM-TXR-KA01-F-01-110. Moreover, any suitable transceiver as would be known in the art that transmits and receives RF signals could be used.

In accordance with an exemplary embodiment, splitter/combiner unit 220 comprises an ortho-mode transducer (OMT). An example of a suitable OMT is a waveguide cavity OMT. In accordance with another exemplary embodiment, splitter/combiner unit 220 comprises a diplexer. An example of a suitable diplexer is a waveguide cavity diplexer. Moreover, any suitable device as would be known in the art that can combine and split RF signals could be used.

Splitter/combiner unit 220 combines two separate signals or separates a single signal into two signals. One of the two signals is a receive signal and the other is a transmit signal. In accordance with an exemplary embodiment, the two signals have different frequencies. In an exemplary embodiment, the two signals are satellite signals which operate in the Ka-band. For example, the Ka-band receive signal frequency may be approximately 20 GHz; while the Ka-band transmit frequency may be approximately 30 GHz. In other exemplary embodiments, the two signals are communication or RADAR signals that operate at X or Ku Band frequencies. Furthermore, splitter/combiner unit 220 may separate or combine any two RF signals that operate at different frequencies.

In accordance with an exemplary embodiment, the receive signal is relayed from antenna feed 230, through the common channel into the splitter/combiner unit 220, where it is directed into the receive channel. Additionally, in an exemplary embodiment, the transmit signal is relayed through the transmit channel, into the splitter/combiner unit 220, where it is directed into the common channel and into antenna feed 230 where the signal is broadcast.

In an exemplary embodiment, an antenna feed comprises a feed horn and a polarizer. For example, a feed horn may be connected to a polarizer, which in turn is connected to a splitter/combiner unit. However, an antenna feed may comprise any components suitable to transmit and receive signals, as would be known in the art.

As mentioned above, power amplifier 210 is in communication with the transmit channel of RF communication system 200. In an exemplary embodiment, power amplifier 210 is a monolithic microwave integrated circuit (MMIC). In another exemplary embodiment, power amplifier 210 is a packaged or discrete amplifier device capable of high power microwave amplification. Moreover, power amplifier 210 can be any suitable amplifier as would be known in the art. In general, power amplifier 210 is configured to amplify the transmit signal to increase the range of transmission. Thus, power amplifier 210 may be any device configured to amplify the transmit signal.

This amplification of the transmit signal in the transmit channel may tend to cause or increase wrap-around leakage. Wrap-around leakage occurs when part of a transmit signal, which is directed through the common channel, diverges into the receive channel. This wrap-around leakage can potentially interfere with a RF communication system's ability to receive signals.

Anti-jam LNA 240, in an exemplary embodiment, provides a level of immunity from transmit wrap-around leakage using one or more techniques. The first technique is reduced LNA gain. Even though reduced LNA gain is counter intuitive because it inherently hurts signal to noise performance, this is outweighed by the benefit of reducing or eliminating the input filtering signal losses. The second technique is to band-limit the LNA by using narrow band matching structures. This provides some amount of out-of-band rejection for the transmit signal in the same way as a filter would, but without the associated loss. The third technique is to configure the linearity of the LNA itself, typically by increasing the linearity. This is done using a larger device or an increased bias voltage and current. Even though larger devices and higher bias points degrade noise performance, it is again out-weighed by the advantage of reduced filter losses. In another exemplary embodiment, anti-jam LNA 240 provides a level of immunity from transmit leakage by utilizing at least one of the three described techniques. In an exemplary embodiment, anti-jam LNA 240 comprises an input and an output, where a signal enters the input and is relayed through the output. Moreover, anti-jam LNA 240 can be any suitable LNA as would be known in the art.

Configuring a LNA to enhance the anti-jam performance by reducing or eliminating losses associated with transmit reject filter 110 may also compromise the low noise performance of RF communication system 200. Enhancement of LNA anti-jam performance may occur by designing LNA characteristics. For example, LNA characteristic designs include shaping the gain, reducing the gain, limiting bandwidth, causing higher linearity, or any combination thereof. However, those design techniques may compromise the low noise performance of RF communication system 200. In an exemplary embodiment, the overall effect on RF communication system 200 of designing LNA characteristics is improvement of the signal to noise ratio performance.

In accordance with an exemplary embodiment, anti-jam LNA 240 is selected to eliminate or reduce the transmit filter. In an exemplary embodiment, anti-jam LNA 240 provides anti-jam resistance up to 30 GHz at a range of +10 to +15 dBm, which enables the elimination of a transmit reject filter from RF communication system 200. In another exemplary embodiment, anti-jam LNA 240 provides anti-jam resistance up to 30 GHz at a range of approximately −10 dBm, which enables the reduction of the number of filter poles present for an effective rejection rate of the transmit reject filter of RF communication system 200.

Figure 3:
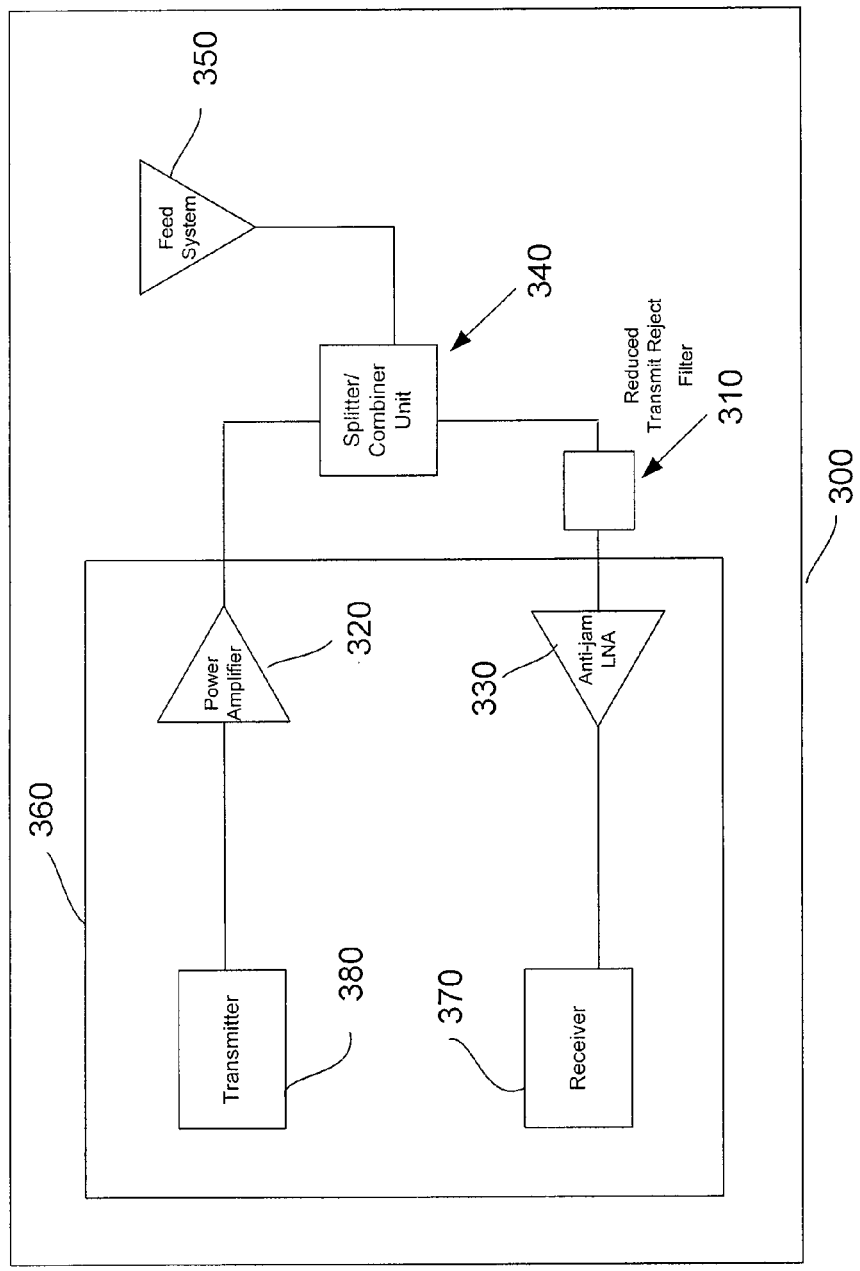
FIG. 3 shows a schematic diagram of an example of a RF communication system with a reduced transmit reject filter.

In general and with reference to prior art FIG. 1, transmit reject filter 110 is configured to block wrap-around leakage of the transmit signal. However, the use of a transmit reject filter desensitizes the receive signal and causes a loss. In general, this loss may be in the range of 0.5 dB to 1.0 dB. In one exemplary embodiment of the invention, no transmit filter is present in the receive channel, as shown by FIG. 2. In another exemplary embodiment, and with reference to FIG. 3, a transmit reject filter 310 is located in the receive channel but in a minimized and reduced fashion in comparison to current transmit filters implemented in comparable RF communication systems. In an exemplary embodiment, transmit reject filter 310 is implemented in a reduced and minimized fashion by reducing the number of poles present in the filter. In another exemplary embodiment, transmit reject filter 310 is minimized and reduced by designing at least one of: the frequency of the filter poles, the filter bandwidth, filter rejection characteristics or any combination thereof.

In an exemplary embodiment, a minimized and reduced transmit reject filter is a filter which may provide reduced rejection and reduced signal loss. In another exemplary embodiment, a minimized and reduced transmit reject filter has 20-50 dB rejection. In comparison, a standard filter currently used in the art may have 85-135 dB rejection. Furthermore, an exemplary embodiment of a minimized and reduced transmit reject filter has 0.2-0.5 dB of signal loss. A standard filter in the prior art may have 0.7 dB or more of signal loss. An additional characterization of a minimized and reduced transmit reject filter is a filter having 1-4 poles, instead of the more traditional five or more poles of a transmit reject filter. Moreover, in the exemplary embodiment previously described which has no transmit reject filter, no poles are present and a filter signal loss of 0 dB occurs because there is no filter.

By configuring RF communication system to implement a minimized filter or eliminate transmit reject filter 310, less of the receive signal is lost, thereby increasing the efficiency of the receive signal relay. However, by lowering the rejection rate of the transmit filter, more of the transmit signal interferes or "jams" the receive signal in the form of wrap-around leakage. In response, the receiver must be able to control the increased jamming. In an exemplary embodiment, a lower LNA gain is capable of handling the jamming because the jamming signal is not as amplified as in prior configurations of RF communication systems. In an exemplary embodiment, a LNA gain in the range of approximately 20-25 dB satisfies the design constraints. In another exemplary embodiment, a LNA gain of 15-25 dB is satisfactory.

In accordance with an exemplary embodiment of the invention, a RF receive signal is substantially isolated from a RF transmit signal. The RF transmit signal is generated in a transmitter and amplified by a power amplifier, then transmitted to a combiner/splitter unit. At approximately the same time, the RF receive signal is received into an antenna feed and routed to the combiner/splitter unit. The RF receive signal is then relayed from the combiner/splitter unit into an anti-jam low noise amplifier, where the receive signal is amplified before being further relayed to the receiver. In an exemplary embodiment, as the RF receive signal is relayed through the anti-jam low noise amplifier, any portion of the RF transmit signal that becomes wrap-around leakage is controlled by the anti-jam low noise amplifier. The wrap-around leakage is controlled by designing the anti-jam low noise amplification to a level no higher than that which the receiver is able to use without substantial interference from wrap-around leakage.

In an exemplary embodiment, signal to noise ratio control in a RF communication system can be improved by designing transmit reject filter characteristics. In another exemplary embodiment, the signal to noise ratio in a RF communication system can be improved by designing a transmit reject filter and a LNA in combination. In a preferred method of system design, a design environment is utilized to configure an optimal signal to noise performance of an RF communication system. A signal to noise ratio improvement occurs through multivariable optimization, the multivariable comprising at least two of: transmit filter rejection, LNA linearity, LNA band limiting and reduced LNA gain. In a preferred method, gradient optimization through a simulation of different system configurations provides an output of an optimal multivariable design. Providing the right balance between transmit filter rejection, LNA linearity, LNA band limiting and reduced LNA gain results in optimal system signal to noise performance.

In an embodiment of design, use of a computer program, such as Advanced Design System (ADS) software, aids in designing a transmit reject filter and a LNA in combination. Design constraints determine the simulation boundaries and optimal configuration can be selected from multiple program outputs. For example, ADS produces output in the form of graphs and histograms.

In accordance with an exemplary embodiment, a benefit of reducing filter rejection rate and lowering LNA gain is an overall power gain of the RF communication system. By reducing or eliminating the losses associated with transmit reject filter 110, the overall effect is a net reduction of power loss in the RF communication system because the additional losses associated with implementing anti-jam features of anti-jam LNA 240 and anti-jam matching is less than the gain associated by the reduction or elimination of transmit reject filter losses. In one embodiment, for example, the elimination of transmit reject filter 110 saves 0.5 dB of signal loss, additional anti-jam features add 0.1 dB of signal loss, and anti-jam matching adds 0.1 dB of signal loss. In this exemplary embodiment, the net effect is a signal loss reduction of 0.3 dB in the RF communication system.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "includes," "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. An apparatus for a radio frequency (RF) signal communication system with improved noise performance, said apparatus comprising:
   a RF combiner/splitter unit;
   an anti jam low noise amplifier (LNA) in communication with said RF combiner/splitter unit;
   absent a transmit reject filter;
   wherein said apparatus is configured to not inhibit wrap-around leakage of a RF transmit signal from passing through said anti jam LNA; and
   wherein a RF receive signal travels through said RF combiner/splitter unit and then directly to and through said anti jam LNA.

2. The apparatus of claim 1, further comprising at least one of a transmitter, a receiver, a power amplifier, and an antenna feed system.

3. The apparatus of claim 1, wherein said RF signal combiner/splitter unit is an orthomode transducer.

4. The apparatus of claim 1, wherein said RF signal combiner/splitter unit is a diplexer.

5. The apparatus of claim 1, wherein the RF receive signal travels through said RF combiner/splitter unit and then through said anti jam LNA, said anti jam LNA is configured to control a RF signal communication noise component; and
   whereby said RF signal communication noise component comprises wrap-around leakage from the RF transmit signal.

6. The apparatus of claim 5, wherein said anti jam LNA controls said RF signal communication noise component by at least one of reducing the gain of said anti jam LNA, band-limiting said anti jam LNA, and adjusting the linearity of said anti-jam LNA.

7. The apparatus of claim 1, where the gain of said anti-jam LNA is designed to compensate for the absence of said transmit reject filter.

8. An apparatus for radio frequency (RF) signal communication noise control, said apparatus comprising:
   a RF combiner/splitter unit;
   a transmit reject filter with only 20-50 dB rejection connected to said RF combiner/splitter unit;
   an anti jam low noise amplifier coupled to said transmit reject filter; and
   wherein a RF receive signal is communicated through said RF combiner/splitter unit to said transmit reject filter and then through said anti jam low noise amplifier.

9. The apparatus of claim 8, said transmit reject filter comprises a number of poles in the range of 1 to 4.

10. The apparatus of claim 8, wherein said transmit reject filter has a signal loss in the range of 0.2-0.5 dB.

11. The apparatus of claim 8, wherein there is no more than 50 dB of reject filtering between said RF combiner/splitter unit and said anti jam low noise amplifier.

12. The apparatus of claim 8, wherein said RF signal combiner/splitter unit is an orthomode transducer.

13. The apparatus of claim 8, wherein said RF signal combiner/splitter unit is a diplexer.

14. A method of isolating a radio frequency (RF) receive signal from a RF transmit signal, said method comprising:
   generating the RF transmit signal;
   amplifying the RF transmit signal with a power amplifier;
   communicating the RF transmit signal from said power amplifier to a RF combiner/splitter unit;
   communicating the RF transmit signal over a common channel to an antenna feed;
   receiving the RF receive signal into said antenna feed;

communicating the RF receive signal from said antenna feed to said RF combiner/splitter unit over said common channel;

communicating the RF receive signal from said RF combiner/splitter unit into an anti-jam low noise amplifier (anti-jam LNA);

amplifying the RF receive signal through said anti jam LNA;

controlling leakage of the RF transmit signal into said anti jam LNA absent a transmit reject filter; and relaying the RF receive signal from said anti jam LNA to a receiver.

15. The method of claim 14, wherein said controlling leakage comprises at least one of reducing the gain of said anti jam LNA, band-limiting said anti-jam LNA, and configuring the linearity of said anti jam LNA.

16. A method of optimizing a signal to noise ratio of a RF communication system, said method comprising:

adding a degree of design freedom by designing a transmit reject filter and a low noise amplifier in combination;

utilizing a multivariable optimization simulation of said transmit reject filter and said low noise amplifier in combination; and wherein designing said transmit reject filter and said low noise amplifier in combination is based upon selecting the transmit filter rejection, the LNA linearity, the LNA band limiting and the reduced LNA gain.

* * * * *